United States Patent
Jempolsky

(12) 
(10) Patent No.: US 6,189,490 B1
(45) Date of Patent: Feb. 20, 2001

(54) LOCKING SYSTEM FOR PET CARRIER

(76) Inventor: Lawrence Jempolsky, 2125 Bath Ave., Brooklyn, NY (US) 11214

( * ) Notice: Under 35 U.S.C. 154(b), the term of this patent shall be extended for 0 days.

(21) Appl. No.: 09/327,884

(22) Filed: Jun. 8, 1999

(51) Int. Cl.[7] .................................................. A01K 1/00
(52) U.S. Cl. ............................................................ 119/497
(58) Field of Search ................................... 119/493, 496, 119/497, 501; 190/19, 21

(56) References Cited

U.S. PATENT DOCUMENTS

| | | | |
|---|---|---|---|
| 747,494 | * | 12/1903 | Smith . |
| 1,168,914 | * | 1/1916 | Spivey et al. . |
| 1,645,992 | * | 10/1927 | Hinde . |
| 3,195,506 | * | 7/1965 | Beard . |
| 4,590,885 | * | 5/1986 | Sugiura ................................... 119/19 |
| 5,184,568 | * | 2/1993 | Healey .................................... 119/19 |
| 5,251,572 | * | 10/1993 | Frame et al. ............................ 119/17 |
| 5,791,292 | * | 8/1998 | Jempolsky ............................ 119/497 |
| 5,979,364 | * | 11/1999 | Ricketts ................................ 119/496 |

* cited by examiner

*Primary Examiner*—Michael J. Carone
*Assistant Examiner*—Jeffrey L. Gellner
(74) *Attorney, Agent, or Firm*—Patrick J. Walsh

(57) ABSTRACT

A carrier for small animals includes a removable front wall which serves as a door, as well as a removable bottom wall which serves as a sliding floor. An animal is captured by removing the sliding floor, enclosing the animal from above, and replacing the sliding floor. The sliding floor and door are provided with an interlock to regulate removal and replacement of floor and door.

4 Claims, 2 Drawing Sheets

LOCKING SYSTEM FOR PET CARRIER

BACKGROUND OF THE INVENTION

The present invention relates to carriers for small animals and particularly to a locking system for a carrier having removable front and bottom enclosing panels.

My U.S. Pat. No 5,791,292 discloses a pet carrier in the form of a box-like structure with upstanding side and rear walls, a removable front wall which serves as a sliding door, as well as a removable bottom wall which serves as a sliding floor.

When capturing a small animal, the carrier is first prepared by placing the sliding front door in position on the carrier and removing the sliding floor. The carrier is placed bottom end first over the animal from above and when the animal is within the carrier, the sliding floor is put back into its place. The front door and sliding bottom are preferably latched to each other to secure the animal within the carrier.

The animal may be released by removing either or both the front door and the sliding bottom.

This invention is directed to a locking system for the sliding front wall and sliding floor.

SUMMARY OF THE INVENTION

In accordance with a preferred embodiment of the present invention, the sliding front door and sliding floor are provided with a locking system to guard against inadvertent removal of either the sliding door or floor, and to provide a particular sequence for removal of either the door or the floor.

The locking system in preferred embodiment comprises interlocking components including a opening or slot through the lower part of the door cooperating with a projection in the form of a lip extending rearwardly from the front edge of the sliding floor. The lip and slot cooperate to limit upward movement of the door. In closed position of the sliding front door and the sliding floor, the projection or lip is positioned in the door slot so that vertical movement of the door is limited to a distance equal to the vertical clearance between lip and slot.

The locking system further comprises interlocking components including a block in the preferred form of a pair of wedges positioned on the upper surface of the sliding floor near the base of the door.

In closed position of the sliding front door and the sliding floor, the wedge cooperates with the door so that the floor cannot slide horizontally to an open position because the door engages the wedges and blocks floor movement. In order to remove the sliding floor, the door must move vertically to clear the wedges, whereupon the floor can slide horizontally for removal from the pet carrier.

As noted, the slot through the door for receiving the floor projection or lip is sufficiently wide to accommodate a short vertical movement of the door to clear the floor wedge with the opening remaining in registry with the lip. Therefore, in order to remove the sliding door, the door must first move the vertical clearance above the floor wedges, the lip and slot disengaged by sliding the floor a short distance outward, and then the door can slide vertically for removal from the pet carrier.

OBJECTS OF THE INVENTION

An object of the invention is to provide an enclosure for transporting small animals with interlocking sliding front door and sliding floor.

Another object of the invention is to provide an enclosure with a particular sequence for removing floor and door.

Another object of the invention is to provide an enclosure for transport of small animals with removable door and floor wherein the floor and door have an interlocking mechanism for securing them in place against inadvertent removal.

Other and further objects of the invention will become apparent with an understanding of the following detailed description of the invention or upon employment of the invention in practice.

DESCRIPTION OF THE DRAWING

A preferred embodiment of the invention has been chosen for purposes of detailed description and is shown in the accompanying drawing in which.

DETAILED DESCRIPTION OF THE PREFERRED EMBODIMENT

Figure 1:
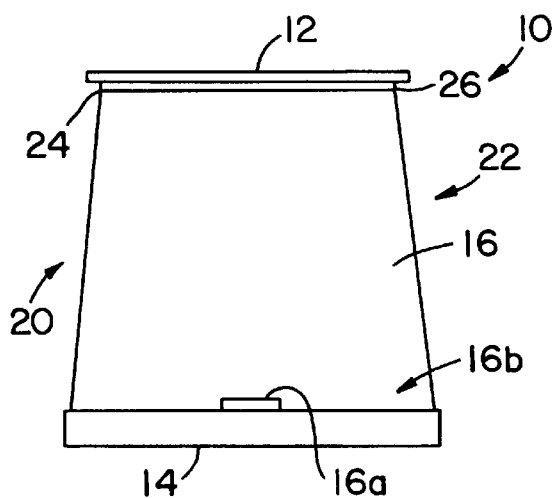
FIG. 1 is a front elevational view of a pet enclosure according to the invention.
Figure 2:
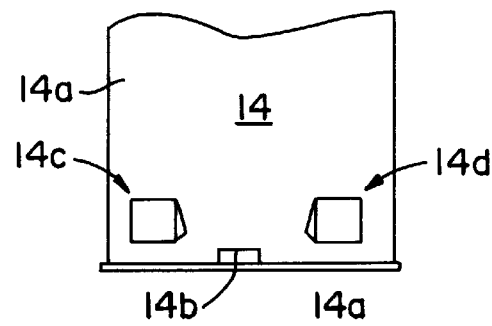
FIG. 2 is a fragmentary plan view of the sliding floor of the pet carrier.

Referring to the drawing (FIGS. 1–6), a transporting enclosure or carrier 10 according to the invention comprises a box-like structure with six wall panels including top 12, bottom 14, front 16, rear (not shown), left 20 and right 22 side walls. Each of the panels is preferably quadrangular with the top wall permanently joined along its left 24 and right 26 edges to the upper edges of the left and right side walls. The rear wall is permanently secured to the mating edges of the top wall as well as the left and right side walls.

The front 16 and bottom walls 14 are slideably mounted on the transporting enclosure in a manner described in U.S. Pat. No. 5,791,292 for removal by horizontal sliding of the floor and vertical sliding of the front door.

The bottom wall or floor 14 at its front edge includes an upright panel 14a mounting a rearwardly extending lip 14b projecting into an opening 16a through a lower part 16b of the front door for limiting vertical movement of the sliding door. The opening 16a is wide enough to allow vertical movement of the door to clear a block or wedges 14c–d fitted to the upper surface 14e of the floor.

Figure 3:
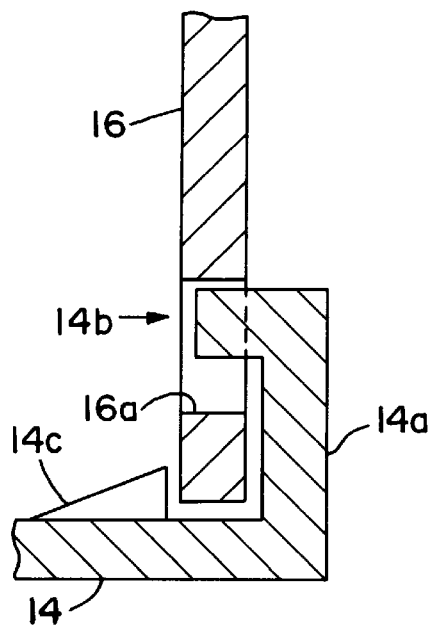
FIGS. 3 through 6 are sequential schematic section views of the cooperating, interlocking components of sliding door and sliding floor according to the invention.

A block in the form of spaced wedges 14c–d is secured to the floor in the vicinity of the base 16b of the door to limit or prevent horizontal sliding movement of the floor when the door is in closed position (FIG. 3).

As shown in FIG. 3, in the closed position of the pet carrier, the sliding door 16 and the sliding floor 14 cooperate to prevent either from moving except by following a proper opening sequence. The base 16b of the door engages the floor wedges to block sliding movement of the floor. The floor lip 14b while in registry with the door opening 16a prevents lifting the door.

The proper opening sequence for floor removal is:
(a) partially lift the door to bring slot margin 16a' into abutment with the underside 14b' of the lip and with the door bottom edge 16c clear of the top 14f of the wedge as in FIG. 4, and
(b) while holding the door in partially lifted position, slide the floor horizontally from the pet carrier as in FIG. 5.

Figure 4:
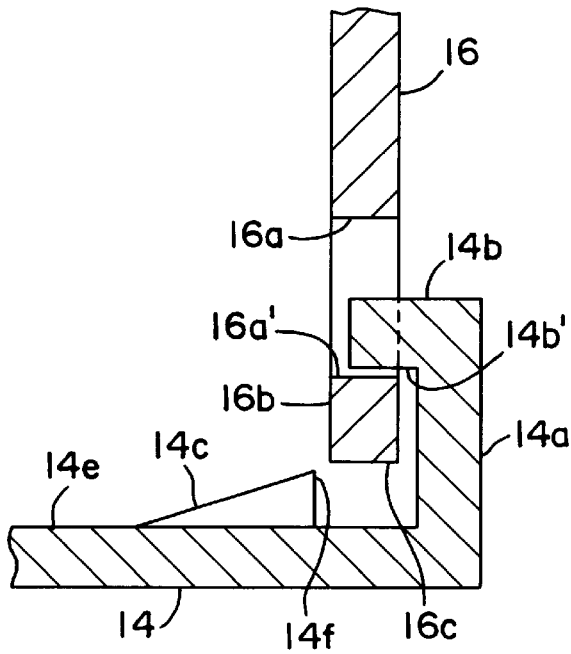
Figure 5:
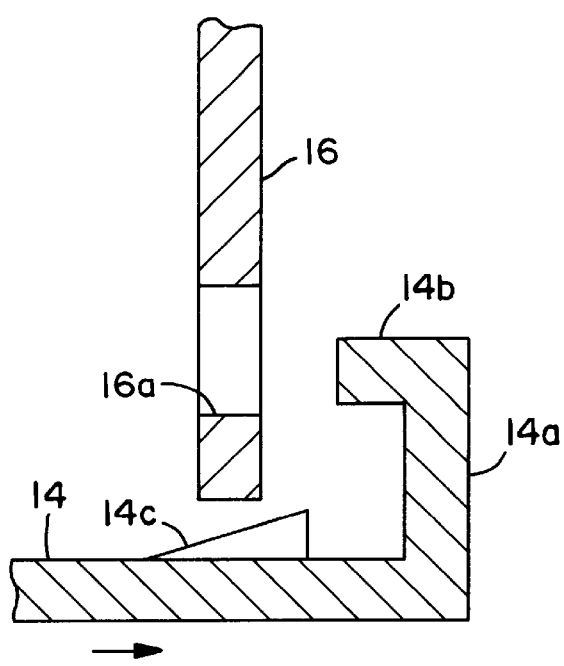
Figure 6:
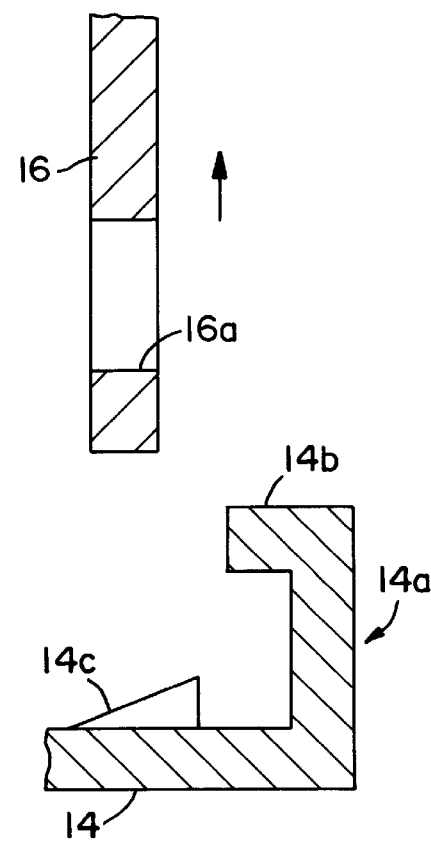

The proper opening sequence for door removal is:

(a) partially lift the door into engagement with the underside of the lip and with the bottom edge clear of the top of the wedge as in FIG. 4;

(b) while holding the door in partially lifted position, slide the floor horizontally to disengage the lip from the slot as in FIG. 5; and (c) lift the door from the pet carrier as in FIG. 6.

For closing the floor with the door in place, the floor slides into place with the inclined surface of each wedge acting as a cam to lift and drop the door back into place as the wedges pass out of contact with the bottom edge of the door.

For closing the door with the floor in place, the door slides into place until its bottom surface engages the top surface of the lip, whereupon the floor is moved outward to clear the lip, the door lowered into contact with the wedges, the floor moved back into place, and the door lowered to final position.

The interlocking door and floor prevents inadvertent removal of either from the pet carrier, requires a specific sequence of movement initially of the door in order to remove the floor by sliding movement from the pet carrier, and further requires reversal of the sequence for replacing the floor. A corresponding specific sequence is also required for replacing with door with the floor in place.

The interlocking components are of robust straightforward construction and easy to operate once the opening and closing sequences are understood.

Various changes may be made to the structure embodying the principles of the invention. The foregoing embodiments are set forth in an illustrative and not in a limiting sense. The scope of the invention is defined by the claims appended hereto.

I claim:

1. A carrier for small animals comprising a box-like structure defining a carrier with an interior chamber for receiving a small animal the carrier having, a removable floor slidably mounted on the carrier, and a removable front door slidably mounted on the carrier, the front door having an opening near its base, the floor having a rearwardly extending projection for registry with the front door opening, the floor having blocking means adjacent the base of the front door whereby the front door opening and floor projection cooperate to limit sliding movement of the door, and further whereby the blocking means and the base of the front door cooperate to limit sliding movement of the floor.

2. A carrier as defined in claim 1 in which the proper sequence for floor removal is:

(a) partially slide the door to bring opening into abutment with the projection and with the door bottom clear of the blocking means, and (b) while holding the door in partially lifted position, slide the floor from the carrier.

3. A carrier as defined in claim 1 in which the proper sequence for door removal is:

(a) slide the door to bring the opening into engagement with the projection and with the bottom of the door clear of the blocking means;

(b) while holding the door in position (a), slide the floor horizontally to disengage the projection from the opening; and (c) slide the door from the carrier.

4. A carrier for small animals comprising a box-like structure defining a carrier with an interior chamber for receiving a small animal the carrier having, a removable floor slidably mounted on the carrier, and a removable front door slidably mounted on the carrier, the front door having an opening near its base, the floor having a rearwardly extending projection for registry with the front door opening, the floor having spaced wedges adjacent the base of the front door whereby the front door opening and floor projection cooperate to limit sliding movement of the door, whereby the wedges and the base of the front door cooperate to limit sliding movement of the floor, whereby the door must be slid clear of the wedges in order to remove the floor, and whereby the door must be slid clear of the wedges and the floor slid to disengage the projection and opening in order to remove the door.

* * * * *